(12) United States Patent
Choi et al.

(10) Patent No.: US 12,509,658 B2
(45) Date of Patent: Dec. 30, 2025

(54) ***PLANOCOCCUS* SP. STRAIN HAVING ASTAXANTHIN SECRETING ABILITY, AND USE THEREOF**

(71) Applicants: DAEGU GYEONGBUK INSTITUTE OF SCIENCE AND TECHNOLOGY, Daegu (KR); KYUNGPOOK NATIONAL UNIVERSITY INDUSTRY-ACADEMIC COOPERATION FOUNDATION, Daegu (KR)

(72) Inventors: Seong Kyoon Choi, Daegu (KR); Ji Hyung Kim, Seongnam-si (KR); Jee Eun Han, Daegu (KR); Hee Yeon Kim, Daegu (KR); Seon Young Park, Seongnam-si (KR); Hyemin Kwon, Seongnam-si (KR)

(73) Assignees: DAEGUGYEONGBUK INSTITUTEOF SCIENCE AND TECHNOLOGY, Daegu (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 366 days.

(21) Appl. No.: 18/032,607

(22) PCT Filed: Sep. 7, 2021

(86) PCT No.: PCT/KR2021/012124
§ 371 (c)(1),
(2) Date: Apr. 19, 2023

(87) PCT Pub. No.: WO2022/085938
PCT Pub. Date: Apr. 28, 2022

(65) Prior Publication Data
US 2025/0270500 A1    Aug. 28, 2025

(30) Foreign Application Priority Data
Oct. 19, 2020 (KR) .................. 10-2020-0134893

(51) Int. Cl.
| | | |
|---|---|---|
| A61K 39/02 | (2006.01) |
| A23K 10/18 | (2016.01) |
| C12N 1/20 | (2006.01) |
| C12R 1/01 | (2006.01) |

(52) U.S. Cl.
CPC .............. *C12N 1/205* (2021.05); *A23K 10/18* (2016.05); *C12R 2001/01* (2021.05)

(58) Field of Classification Search
None
See application file for complete search history.

(56) References Cited

FOREIGN PATENT DOCUMENTS

| JP | 2009142275 | 7/2009 |
| KR | 101847551 | 4/2018 |

OTHER PUBLICATIONS

GenBank: MT328548.1: *Planococcus* sp. (in: Bacteria) strain KRIBB-KS-1 16S ribosomal RNA gene, partial sequence (Apr. 18, 2020).
Jin Ho Kim et al., "*Planococcus faecalis* sp. nov., a carotenoid-producing species isolated from stools of Antarctic penguins," International Journal of Systematic and Evolutionary Microbiology (2015), 65, 3373-3378, DOI 10.1099/ijsem.0.000423.
Michal Styczynski et al., "Genome-Based Insights into the Production of Carotenoids by Antarctic Bacteria, *Planococcus* sp. ANT_H30 and *Rhodococcus* sp. ANT_H53B," Molecules 2020, 25, 4357; doi:10.3390/molecules25194357.

*Primary Examiner* — Jennifer E Graser
(74) *Attorney, Agent, or Firm* — LEX IP MEISTER, PLLC

(57) ABSTRACT

The present invention relates to a *Planococcus* sp. strain having astaxanthin secreting ability, and uses thereof. In the present invention, a novel microorganism secreting astaxanthin has been identified from a *Planococcus* sp. strain secreting a carotenoid compound. Accordingly, the *Planococcus* sp. strain of the present invention is a novel microorganism that secretes astaxanthin, and has potential to be efficiently utilized as feed, a food additive, a cosmetic, and the like.

3 Claims, 2 Drawing Sheets

Specification includes a Sequence Listing.

[FIG. 1]
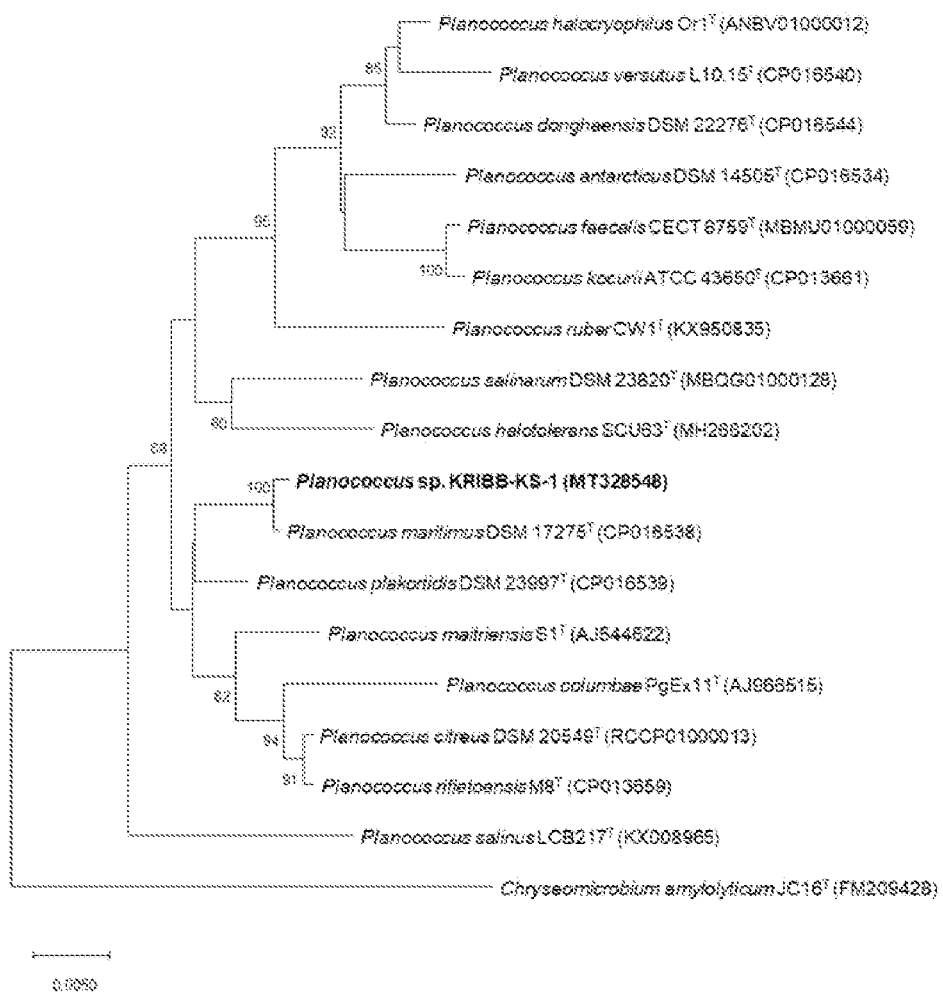

[FIG. 2]
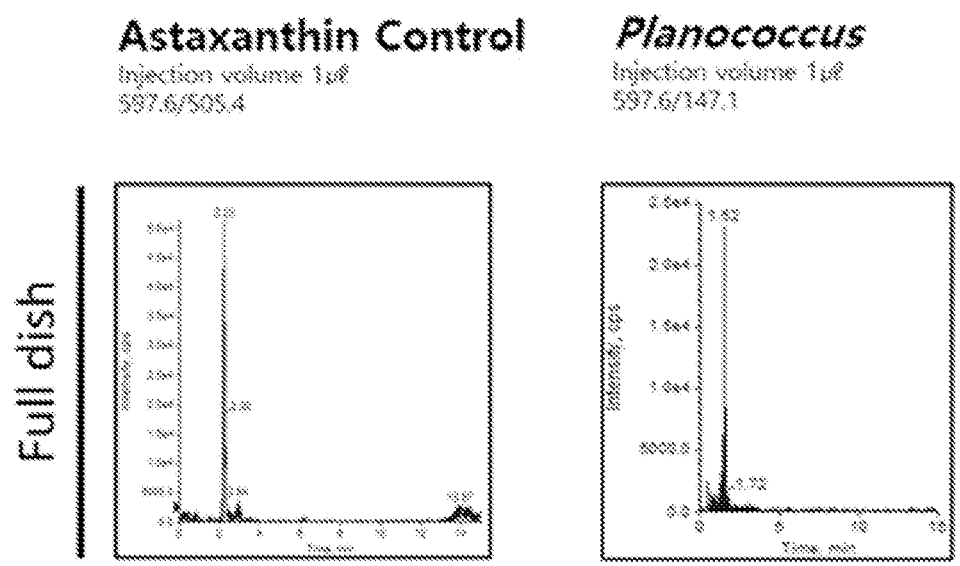

SEQUENCE LISTING

<160> NUMBER OF SEQ ID NOS: 1

<210> SEQ ID NO 1
<211> LENGTH: 1473
<212> TYPE: DNA
<213> ORGANISM: Planococcus sp. KRIBB-KS-1

<400> SEQUENCE: 1

| | | | | | |
|---|---|---|---|---|---|
| gacgaacgct | ggcggcgtgc | ctaatacatg | caagtcgagc | ggaaccttag | gagcttgctc | 60 |
| ctttggttta | gcggcggacg | ggtgagtaac | acgtgggcaa | cctgccctgc | agatcgggat | 120 |
| aactccggga | aaccggtgct | aataccgaat | agtttgcggc | ctctcatgag | gctgtacgga | 180 |
| aagacggttt | cggctgtcac | tgcaggatgg | gcccgcggcg | cattagctag | ttggtggggt | 240 |
| aatggcctac | caaggcgacg | atgcgtagcc | gacctgagag | ggtgatcggc | cacactggga | 300 |
| ctgagacacg | gcccagactc | ctacgggagg | cagcagtagg | gaatcttccg | caatggacga | 360 |
| aagtctgacg | gagcaacgcc | gcgtgagtga | agaaggtttt | cggatcgtaa | aactctgttg | 420 |
| tgagggaaga | acaagtacca | actaactatt | ggtaccttga | cggtacctca | ccagaaagcc | 480 |
| acggctaact | acgtgccagc | agccgcggta | atacgtaggt | ggcaagcgtt | gtccggaatt | 540 |
| attgggcgta | aagcgcgcgc | aggcggtcct | ttaagtctga | tgtgaaagcc | cacggctcaa | 600 |
| ccgtggaggg | tcattggaaa | ctgggggact | tgagtgcaga | agaggaaagt | ggaattccac | 660 |
| gtgtagcggt | gaaatgcgta | gagatgtgga | ggaacaccag | tggcgaaggc | gactttctgg | 720 |
| tctgtaactg | acgctgaggc | gcgaaagcgt | ggggagcaaa | caggattaga | taccctggta | 780 |
| gtccacgccg | taaacgatga | gtgctaagtg | ttaggggggtt | tccgccccctt | agtgctgcag | 840 |
| ctaacgcatt | aagcactccg | cctggggagt | acggccgcaa | ggctgaaact | caaaggaatt | 900 |
| gacggggggcc | cgcacaagcg | gtggagcatg | tggtttaatt | cgaagcaacg | cgaagaacct | 960 |
| taccaggtct | tgacatcccg | ctgaccgcct | aggagactag | gctttccctt | cggggacagc | 1020 |
| ggtgacaggt | ggtgcatggt | tgtcgtcagc | tcgtgtcgtg | agatgttggg | ttaagtcccg | 1080 |
| caacgagcgc | aacccttgat | cttagttgcc | agcattcagt | tgggcactct | aaggtgactg | 1140 |
| ccggtgacaa | accggaggaa | ggtggggatg | acgtcaaatc | atcatgcccc | ttatgacctg | 1200 |
| ggctacacac | gtgctacaat | ggacggtaca | aagggctgca | aacccgcgag | ggggagccaa | 1260 |
| tcccagaaaa | ccgttctcag | ttcggattgt | aggctgcaac | tcgcctgcat | gaagccggaa | 1320 |
| tcgctagtaa | tcgcggatca | gcatgccgcg | gtgaatacgt | tcccgggcct | tgtacacacc | 1380 |
| gcccgtcaca | ccacgagagt | ttgtaacacc | cgaagtcggt | ggggtaaccc | ttacgggagc | 1440 |
| cagccgccga | aggtgggaca | gatgattggg | gtg | | | 1473 |

PLANOCOCCUS SP. STRAIN HAVING ASTAXANTHIN SECRETING ABILITY, AND USE THEREOF

TECHNICAL FIELD

The present disclosure relates to a *Planococcus* sp. strain having astaxanthin secreting ability and a use thereof.

BACKGROUND ART

Astaxanthin, a C40 type pigment, is known to have efficacy in preventing circulatory diseases and adult diseases through biological functions such as vitamin A precursor, antioxidation, scavenging of active oxygen, and inhibition of cancer cell proliferation in the human body. In addition, with reported studies in that astaxanthin improves immune functions to reduce skin damage from ultraviolet exposure or suppress melanin biosynthesis, it is gaining attention as a cosmetic ingredient in Europe and the United States. Astaxanthin is used as a pigment-increasing substance in industry with economic demand growing by more than 15% every year, such that researches on various ways to produce astaxanthin are on the way in major countries around the world.

In order to produce natural astaxanthin, algae, bacteria, or crustaceans are used as raw materials, but in the case of astaxanthin that is extracted and produced from crustaceans, there are problems such as high cost and waste disposal after extraction. Overcoming these issues, production of astaxanthin using microorganisms is attracting attention. Microorganisms such as Haematococcus pluvialis, Phaffia rhodozyma, *Brevibacterium* linens, and *Agrobacterium aurantiacum* are known to produce astaxanthin for production of natural astaxanthin. However, there have been no cases reported on a *Planococcus* sp. strain that directly secretes astaxanthin.

DISCLOSURE OF THE INVENTION

Technical Goals

An object of the present disclosure is to provide a *Planococcus* sp. strain KRIBB-KS-1 which is deposited under KCTC14203BP and has astaxanthin secreting ability.

In addition, another object of the present disclosure is to provide an astaxanthin production method including culturing the strain.

In addition, another object of the present disclosure is to provide a feed composition, a food additive composition, or a cosmetic composition including the strain or a culture thereof as an active ingredient.

Technical Solutions

In order to achieve the above object, the present disclosure provides a *Planococcus* sp. strain KRIBB-KS-1 which is deposited under KCTC14203BP and has astaxanthin secreting ability.

In addition, the present disclosure provides an astaxanthin production method including culturing the strain.

In addition, the present disclosure provides a feed composition including the strain or a culture thereof as an active ingredient.

In addition, the present disclosure provides a food additive composition including the strain or a culture thereof as an active ingredient.

In addition, the present disclosure provides a cosmetic composition for wrinkle amelioration or skin whitening, including the strain or a culture thereof as an active ingredient.

Advantageous Effects

The present disclosure relates to a *Planococcus* sp. strain having astaxanthin secreting ability and a use thereof, wherein a novel microorganism that secretes astaxanthin was identified from the *Planococcus* sp. strain secreting a carotenoid compound. Accordingly, the *Planococcus* sp. strain of the present disclosure, as a novel microorganism secreting astaxanthin, may be usefully utilized as feeds, food additives, and cosmetic ingredients.

BRIEF DESCRIPTION OF DRAWINGS

FIG. 1 shows a result of phylogenetic analysis in the same genus of a *Planococcus* sp. strain KRIBB-KS-1.

FIG. 2 shows results of detecting astaxanthin secreted by a *Planococcus* sp. strain KRIBB-KS-1.

BEST MODE FOR CARRYING OUT THE INVENTION

The present disclosure provides a *Planococcus* sp. strain KRIBB-KS-1 which is deposited under KCTC14203BP and has astaxanthin secreting ability.

Preferably, the strain may include a 16S rDNA sequence represented by SEQ ID NO: 1, but is not limited thereto.

In addition, the present disclosure provides an astaxanthin production method including culturing the strain.

The term "culture" as used herein refers to growing the strain of the present disclosure under appropriately, artificially controlled environmental conditions.

The strain of the present disclosure may be grown in a conventional medium, wherein the medium may include nutrient materials required by a target of culture, that is, a strain to be cultured in order to culture a specific strain, while substances for a special purpose may be further added and mixed. The medium is also called a culture and is a concept that includes both a natural medium, a synthetic medium, or a selective medium. The strain of the present disclosure may be cultured according to conventional culture methods.

The medium used for culture must meet requirements for a specific strain in an appropriate manner while controlling temperature and pH in a conventional medium containing a suitable carbon source, a nitrogen source, amino acids, and vitamins. As for the carbon source that may be used, blended sugars of glucose and xylose are used as a main carbon source, additionally including sugars and carbohydrates such as sucrose, lactose, fructose, maltose, starch, and cellulose, oils and fats such as soybean oil, sunflower oil, castor oil, and coconut oil, fatty acids such as palmitic acid, stearic acid, and linoleic acid, alcohols such as glycerol and ethanol, and organic acids such as acetic acid. These materials may be used individually or as mixtures. As the nitrogen source that may be used, inorganic nitrogen sources such as ammonia, ammonium sulfate, ammonium chloride, ammonium acetate, ammonium phosphate, ammonium carbonate, and ammonium nitrate; and organic nitrogen sources such as amino acids and peptones such as glutamic acid, methionine, and glutamine, NZ-amine, meat extract, yeast extract, malt extract, corn immersion solution, casein hydrolysate, fish or decomposed products thereof, and skimmed soybean cake or decomposed products thereof may be used. These nitrogen sources may be used alone or in combination. The medium may include first potassium phosphate, second potassium phosphate, and corresponding sodium-containing salts as a phosphorus source. The phosphorus source that may be used includes potassium dihydrogen phosphate or dipotassium hydrogen phosphate or the corresponding sodium-containing salt. In addition, sodium chloride, calcium chloride, iron chloride, magnesium sulfate, iron sulfate, manganese sulfate, and calcium carbonate may be used as the inorganic compounds. Finally, in addition to the materials above, essential growth substances such as amino acids and vitamins may be used.

In addition, suitable precursors may be used in the culture medium. The above-described raw materials may be added via batch, fed-batch or continuous types by a method suitable for the culture in the culture process, but are not particularly limited thereto. Basic compounds such as sodium hydroxide, potassium hydroxide, and ammonia, or acid compounds such as phosphoric acid or sulfuric acid may be used in an appropriate manner to control the pH of the culture.

In addition, the present disclosure provides a feed composition including the strain or a culture thereof as an active ingredient.

The term "feed composition" as used herein refers to a feed fed to animals. The feed composition refers to a substance that supplies organic or inorganic nutrients necessary to maintain the life of animal or produce meat and milk. The feed composition may additionally include nutrients necessary to maintain the life of animal or produce meat and milk.

The content of a composition including the *Planococcus* sp. strain KRIBB-KS-1, a culture of the strain, a concentrate of the culture, or a dried product of the concentrate included in the feed composition of the present disclosure may be appropriately adjusted according to the type and age of the applied livestock, the form of application, and the desired effect, for example, the dose may be 0.01 to 1% (w/w), 0.01 to 0.5% (w/w), or 0.15 to 0.5% (w/w).

In the feed composition of the present disclosure, one or more types of organic acids such as citric acid, fumaric acid, adipic acid, and lactic acid; phosphates such as potassium phosphate, sodium phosphate, and polymerized phosphate; and natural antioxidants such as polyphenols, catechins, tocopherols, vitamin C, green tea extract, chitosan, and tannic acid may be additionally mixed and used for administration, and other conventional additives such as anti-influenza, buffers, and bacteriostatic agents may be added as needed. In addition, in the feed composition of the present disclosure, diluents, dispersants, surfactants, binders, and lubricants may be additionally added to formulate into an injectable formulation such as an aqueous solution, suspension, and emulsion as well as capsules, granules, or tablets. In addition, in the feed composition of the present disclosure, nutritional supplements, growth promoters, digestion absorption promoters, and disease prevention agents may be used as supplementary components, in addition to major components such as various supplements such as amino acids, inorganic salts, vitamins, antioxidants, antifungal agents, and antibacterial agents, vegetable protein feed such as crushed or ground wheat, barley, and corn, animal protein feed such as blood meal, meat meal, and fish meal, animal fat, and vegetable fat.

The feed composition of the present disclosure may be mixed in livestock feed in an amount of about 10 to 500 g per 1 kg with respect to dry weight, for example, 10 to 100 g, and may be thoroughly mixed to be fed as mash, or may undergo pelletization, expansion, or extrusion processes through an additional processing process.

In addition, the present disclosure provides a food additive composition including the strain or a culture thereof as an active ingredient.

The term "food additive" as used herein refers to a substance used by being added, mixed, infiltrated, or other methods in food for the manufacture, processing, or preservation of food. The form of the food additive is not particularly limited and includes powder, granule, tablet, capsule, or liquid forms.

In the present disclosure, the food additive may further include a known natural product or compound in addition to the strain of the present disclosure or a culture thereof, and further include sweeteners, flavoring agents, bioactive components, and minerals.

In addition to the above sweeteners, the food additive of the present disclosure may include preservatives, emulsifiers, acidulants, and thickeners as needed. It is preferred that such preservative and emulsifier are added and used in trace amounts as long as the use of addition thereof may be achieved.

In addition, the present disclosure provides a cosmetic composition for wrinkle amelioration or skin whitening, including the strain or a culture thereof as an active ingredient.

The cosmetic composition may include conventional adjuvants such as stabilizers, solubilizers, vitamins, pigments and fragrances, as well as carriers in addition to active ingredients.

The formulation of the cosmetic composition may be prepared in any formulation commonly prepared in the art, and may have formulation selected from the group consisting of an external skin ointment, cream, softening lotion, nourishing toner, pack, essence, hair tonic, shampoo, conditioner, hair conditioner, hair treatment, gel, skin lotion, skin softener, skin toner, astringent, lotion, milk lotion, moisture lotion, nourishing lotion, massage cream, nourishing cream, eye cream, moisture cream, hand cream, foundation, nourishing essence, sunscreen, soap, cleansing foam, cleansing lotion, cleansing cream, body lotion, and body cleanser, but is not limited thereto. The composition of each of these formulations may include various substrates and additives necessary and suitable for formulation of the formulation, and the types and quantities of these components may be easily selected by those skilled in the art.

In case of the formulation is a paste, cream or gel, animal oil, vegetable oil, wax, paraffin, starch, tracanth, cellulose derivatives, polyethylene glycol, silicone, bentonite, silica, talc, or zinc oxide may be used as a carrier component.

In case of the formulation is powder or spray, lactose, talc, silica, aluminum hydroxide, calcium silicate or polyamide powder may be used as the carrier component, and in particular, in the case of the spray, chlorofluorohydrocarbon, propane/butane, or a booster such as dimethyl ether may be additionally included.

In case of the formulation is a solution or emulsion, solvents, solubilizers or emulsifiers are used as the carrier component, for example, water, ethanol, isopropanol, ethyl carbonate, ethyl acetate, benzyl alcohol, benzyl benzoate, propylene glycol, 1,3-butylglycol oil, glycerol fatty ester, polyethylene glycol, or fatty acid ester of sorbitan.

In case of the formulation is a suspension, a liquid diluent such as water, ethanol, or propylene glycol, a suspending agent such as ethoxylated isostearyl alcohol, polyoxyethylene sorbitol ester, and polyoxyethylene sorbitan ester, microcrystalline cellulose, aluminum metahydroxide, bentonite, agar, or tracanth may be used as the carrier component.

MODES FOR CARRYING OUT THE INVENTION

Hereinafter, example embodiments will be described in detail to help the understanding of the present disclosure. However, the following example embodiments are merely illustrative of the content of the present disclosure, and the scope of the present disclosure is not limited to the following example embodiments. The example embodiments of the present disclosure are provided to more completely explain the present disclosure to those skilled in the art.

<Example 1> Isolation and Identification of a Planococcus sp. Strain

A *Planococcus* sp. strain KRIBB-KS-1 was isolated from sediment in the aquaculture tank at a rainbow trout farm (36° 27'N 127° 27'E) in Chungcheongbuk-do in February 2019. For the isolation of the strain, precipitates were obtained through centrifugation of aquaculture-collected specimens, and the obtained sediment was cultured at 20° C. for more than 48 hours using a streak plate method in tryptic soy agar (TSA, Difco). Orange bacterial colonies were purely isolated on the TSA medium to continue subculture under the same medium and culture conditions, and finally the orange bacterial colonies after 1 week were purely isolated.

For identification of the isolated strains, genomic DNA of bacteria was extracted using the DNeasy blood & Tissue kit (Qiagen), and 16S rRNA amplification was performed for the extracted DNA using 27F/1492R universal primer. Amplicon obtained via PCR was subjected to sequencing using 785F/907R universal primer, and strain identification was performed for the finally obtained 16S rRNA sequence using 16S-based ID in EZBioCloud (https://www.ezbiocloud.net/).

As a result of strain identification, it was found that the 16S rRNA gene of isolated strain had a 99.86% match with that of *Planococcus maritimus*, with >97% 16S rRNA similarity shown when compared with other species in the same genus. Based on this, the isolated strain was identified as the genus *Planococcus*.

For phylogenetic analysis with 16S rRNA gene derived from the standard strain of other strains in the same genus of the secured 16S rRNA genes, the corresponding gene group was first obtained, a dataset was prepared, then the dataset was optimized using Clustal X (version 1.83) and BioEdit Sequence Alignment Editor (version 7.1.0.3), and finally MEGA (ver. 7.0) was used to prepare a phylogenetic tree (FIG. 1). The Neighbor-Joining (NJ) analysis method using the Jukes-Cantor method was used for the phylogenetic analysis, and the reliability in the phylogenetic tree was ensured via 1,000 bootstrap analysis. Based on these results, the isolated strain was finally named *Planococcus* sp. strain KRIBB-KS-1, deposited on Jun. 4, 2020 with the Korean Collection for Type Cultures, Korea Research Institute of Bioscience & BioTechnology (KRIBB), 181, Ipsin-gil. Jeongeup-si, Jeollabuk-do, 56212, Republic of Korea) under accession number KCTC 14203BP, and the 16S rRNA gene of the strain was deposited in GenBank as MT328548 (https://www.ncbi.nlm.nih.gov/nuccore/MT328548; SEQ ID NO: 1).

<Example 2> Analysis of Astaxanthin

For analysis of astaxanthin, the isolated *Planococcus* sp. strain KRIBB-KS-1 was subjected to a streak plate method in tryptic soy agar (TSA, Difco). For culture with a strain density of 90% or more in a flat medium, culture was performed at 20° C. for more than 48 hours.

Formic acid used in this study as a reagent was from Thermo Scientific, and acetonitrile (CAN) as the reagent was purchased from Honeywell. Acetone and methanol used as reagents were from DUKSAN.

Astaxanthin extraction was carried out with reference to papers published by Seo et al. The whole colony of the *Planococcus* strain was suspended in 1 ml of LB broth and centrifuged at 13,000 rpm for 5 minutes. After centrifugation, a supernatant was removed, and the pellet was suspended in 1 ml of 90% acetone. Cells were disrupted using a homogenizer for 3 minutes, and then centrifuged at 13,000 rpm for 2 minutes. The supernatant was filtered using a syringe filter (0.22 μm, nylon filter) and then dried using Hyper Vac (Hanil). A paper published by Rivera et al. was used for reference, and SCIEX's Q-trap 5500 was used for astaxanthin analysis. XB-C18 (50×0.03 mm, 2.6 μm) from KINETEX was used as the column. Electrospray ionization (ESI) was applied, and the analysis was performed in positive ion mode. The flowrate was set to 20 μL/min. For mobile phase, 0.1% formic acid (A) and 70% ACN, 30% MeOH, and 0.1% formic acid (B) were used along with distilled water. The previously reported ratios as shown in Table 1 were used for the slope. The overall analysis time was 15 minutes, and the analysis was performed with injection volume of 1 μL. As shown in Table 2, multiple reaction monitoring (MRM) analysis was performed.

TABLE 1

| Time | % A | % B |
| --- | --- | --- |
| 0 | 15 | 85 |
| 2 | 15 | 85 |
| 3 | 0 | 100 |
| 11.6 | 0 | 100 |
| 12.6 | 15 | 85 |
| 15 | 15 | 85 |

TABLE 2

| Precursor Ion | Product Ion | Dwell | CE |
| --- | --- | --- | --- |
| 597.6 | 147.1 | 20 | 20 |
| 597.6 | 505.4 | 20 | 10 |

As a result of multiple reaction monitoring (MRM) analysis for astaxanthin in the *Planococcus* sp. strain KRIBB-KS-1, astaxanthin secreted by the *Planococcus* sp. strain KRIBB-KS-1 was detected as shown in FIG. 2.

As described above, a specific part of the content of the present disclosure is described in detail, for those of ordinary skill in the art, it is clear that the specific description is only a preferred embodiment, and the scope of the present disclosure is not limited thereby. Accordingly, the substantial scope of the present disclosure will be defined by the appended claims and equivalents thereof.

The invention claimed is:

1. A *Planococcus* sp. strain KRIBB-KS-1 which is deposited under KCTC14203BP and has astaxanthin secreting ability,
   wherein the strain comprises a 16S rDNA sequence set forth in SEQ ID NO: 1.

2. A feed composition, comprising the strain according to claim 1 or a culture thereof as an active ingredient.

3. A food additive composition, comprising the strain according to claim 1 or a culture thereof as an active ingredient.

* * * * *